E. D. Hurst.
Thread Guide for Spinning Mach.
No. 45,718. Patented Jan. 3, 1865.

Witnesses;
W. B. Riley
Jacob Hauff

Inventor;
Elam D. Hurst

UNITED STATES PATENT OFFICE.

ELAM D. HURST, OF LANCASTER, PENNSYLVANIA.

IMPROVEMENT IN THREAD-GUIDES FOR SPININNG-MACHINES.

Specification forming part of Letters Patent No. 45,718, dated January 3, 1865.

*To all whom it may concern:*

Be it known that I, ELAM D. HURST, of Lancaster, in the county of Lancaster and State of Pennsylvania, have invented a new and useful Improvement on Guides used in Factories for Spinning and other Purposes; and I do hereby declare that the following is a full and exact description thereof, reference being had to the accompanying drawings, and to the letters of reference marked thereon.

The nature of my invention consists in providing a smooth glass surface for the eye of the curved guide at the point where the vibrating thread comes in constant contact with the guide, and, as experience has taught us, that this constant friction wears a groove in the eye in a single year's use, which needs repairing or a change of the guide, it is found that glass obviates this defect and resists the wear far better than brass, iron, or steel, and produces better or more uniform results.

I am aware that glass eyes, as bearing-surfaces, have been used, but not applied in the manner and for the purpose specified.

Figure 1:
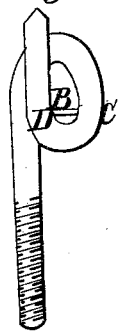
Figure 2:
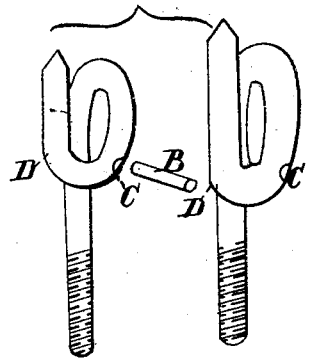

To enable others to use my invention, I have shown at Figure 1 the glass cylinder B inserted in its place. Fig. 2 shows the same turned, in order to exhibit the hole c drilled through the outer curve and partly into the inner side at D. The glass cylinder B is then introduced, and a little putty or sealing-wax on the outside will effectually keep the glass in its place.

Simple as this invention is, and as useful as it is simple, I am not aware that such an application of glass has ever been made to the eye of a guide for spinning purposes.

What I claim as my invention, and desire to secure by Letters Patent, is—

The use of a glass, cylinder, introduced into the eye of metallic guides through a perforation made for that purpose, in the manner specified.

ELAM D. HURST.

Witnesses:
    WM. B. WILEY,
    JACOB STAUFFER.